Figure 1:
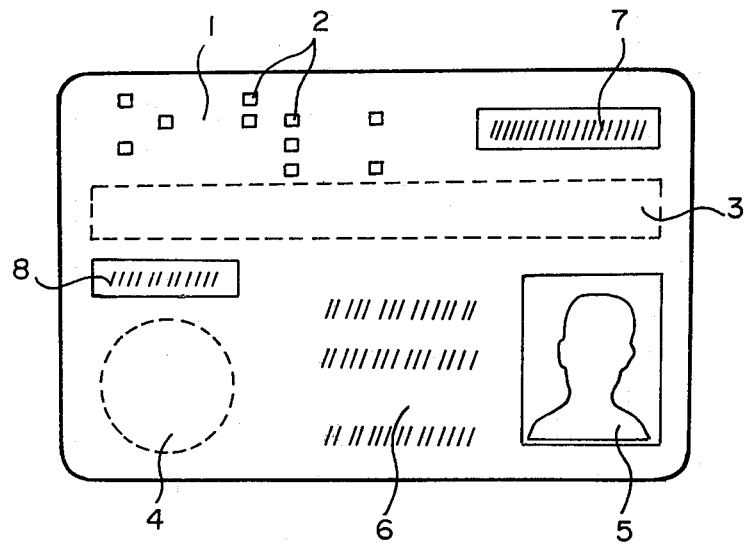

United States Patent [19]
Hogberg

[11] 3,959,630
[45] May 25, 1976

[54] IDENTITY CARD HAVING RADIOACTIVE ISOTOPE OF SHORT HALF-LIFE

[75] Inventor: Goran Hogberg, Vallingby, Sweden

[73] Assignee: AB Id-Kort, Stockholm, Sweden

[22] Filed: July 3, 1974

[21] Appl. No.: 485,565

Related U.S. Application Data

[63] Continuation of Ser. No. 367,224, June 5, 1973, abandoned.

[30] Foreign Application Priority Data

June 5, 1973 Sweden .............................. 737368

[52] U.S. Cl. ................ 235/61.12 N; 235/61.12 M; 235/61.7 B; 235/61.11 D; 235/61.11 E; 340/149 A; 250/271; 250/493
[51] Int. Cl.² ..................... G06K 19/00; G06K 7/08
[58] Field of Search ............... 235/61.7 B, 61.11 E, 235/61.11 D, 61.12 N, 61.12 R, 61.12 M; 250/271, 303, 493; 340/149 A; 40/2.2

[56] References Cited
UNITED STATES PATENTS

| | | |
|---|---|---|
| 3,092,402 | 6/1963 | Reed ........................... 235/61.12 N |
| 3,295,651 | 1/1967 | Klackowski et al. ................ 250/303 |
| 3,457,391 | 7/1969 | Yamamoto .................... 235/61.11 E |
| 3,564,215 | 2/1971 | Pieples, Jr. et al. ................ 250/493 |
| 3,588,379 | 6/1971 | Young et al. ................ 235/61.11 D |
| 3,805,067 | 4/1974 | Wing .................................. 250/303 |

OTHER PUBLICATIONS

IBM Tech. Disc. Bull., "Cooling Documents by Trace Element Inclusion," by Tracy, Vol. 11, No. 11, Apr. 1969, p. 1394.

*Primary Examiner*—Stanley M. Urynowicz, Jr.
*Attorney, Agent, or Firm*—Toren, McGeady and Stanger

[57] ABSTRACT

An identity card contains a radioactive substance and information on the intensity of the radiation of said substance. When the card is used, for example in a banking transaction, the current intensity is measured and compared with the information on the intensity given on the card. If the current intensity and the given intensity agree, the card is to be considered genuine.

10 Claims, 3 Drawing Figures

IDENTITY CARD HAVING RADIOACTIVE ISOTOPE OF SHORT HALF-LIFE

This is a continuation of application Ser. No. 367,224, filed June 5, 1973 now abandoned.

The invention relates to an identity card. By this is meant in the following not only identity cards in the narrow sense, containing a photograph of and information concerning the owner, but even similar documents, the authenticity of which must be confirmed. Such documents might be so-called account cards or documents entitling the owner to take money out of a bank account.

Identity cards provided with a radioactive marking are already known. Such radioactive marking has been used in various ways. One way is for all identity cards issued to be provided with the same quantity of radioactive material. When checking such an identity card, an examination is made to ensure that the intensity of the radioactive radiation lies within predetermined limits. Another method is for the radioactive marking to be placed in a certain pattern on the identity card. When the card is checked, then, it is examined to see whether the pattern has the correct appearance. According to the invention it has now been found that the radioactive marking can be used to construct an identity card with increased reliability against forgery and copying if codified information as to the intensity of the radiation from the radioactive substance is also applied on the identity card. When the card is checked the prevailing radiation intensity is compared with the codified information as to intensity. If these agree, then the card is genuine and valid.

For one embodiment of the identity card according to the invention a radioactive substance is used which has such a long half-life that decrease of the radiation during the validity of the identity card can be disregarded. The codified information need then only state the initial intensity. Since this codified information will not be altered during the validity of the card it may be in the form of indestructable printing on the card or in the form of a perforation of the card. A suitable radioactive isotope is the strontium isotope $Sr^{90}$ which has a half-life of 28 years. A quantity of 1–5 mg, for example, of this isotope may be applied on the card. Such an identity card may be given a validity of 5–10 years, for example. The quantity of radio-active substance shall, of course, be so low that the card is by no means harmful to its owner, not even upon a very long exposure.

In a preferred embodiment of the identity card according to the invention, a radioactive isotope may be used which has such a short half-life that the intensity of the radiation decreases considerably during the validity of the card. As in the first case, the codified information states the initial intensity of the radiation. The date for this initial intensity must be indicated on the card, either in codified form or printed out. When checking the card, the decrease in intensity which has taken place in the interim must be taken into consideration. This is done with the help of the formula for radioactive decay:

$$I = I_o \cdot 2^{-\frac{t}{t_{\frac{1}{2}}}}$$

where I is the intensity measured on the occasion of checking, $I_o$ is the initial intensity, $t$ is the time between the initial date and the date of checking, and $t_{\frac{1}{2}}$ is the half-life. The following example may be given. In an identity card having a validity period of 5 years a radioactive isotope in the form of thallium sulphate is incorporated in a quantity which will give an initial intensity of 500 cps (counts per second). According to the above formula the radiation intensity will have fallen after two years to $$I = 500 \cdot 2^{-\frac{2}{3}} \cdot 8 = 350 \text{ cps.}$$

If the card is checked at this time, it may be considered as genuine in view of unforseen factors, if the radiation intensity lies within the range 290 – 400 cps. These values are based on a measuring time of 1 sec. If the measuring time is longer the interval can be made narrower, and the chances of distinguishing differing cards also increase.

In another preferred embodiment of the idendity card according to the invention a radioactive isotope is used, as in the preceding case, which has such a short half-life that the radiation intensity decreases considerably during the validity period of the card. However, each time the card is checked, the codified information is altered to indicate the radiation intensity at the time of checking and the date when checking was performed. The codified information must then be able to be altered several times and is preferably in the form of a magnetic code with the help of a magnetic tape which is incorporated into the card.

Useful radioactive isotopes having a short half-life are the thallium isotope $Tl^{204}$ (3.8 years) and the prometium isotope $Pm^{147}$ (2.6 years). The validity period of an identity card should not be longer than three half-life periods, and should preferably not exceed two half-life periods.

All identity cards belonging to the same set of cards may contain the same radioactive isotope. Alternatively, one set of identity cards may be divided into several groups, all cards of one group containing a radioactive isotope which is dissimilar to that of the other groups. This, however, creates the complication that all cards must contain an additional piece of information, viz. information concering the particular group to which the card belongs.

Figure 2:
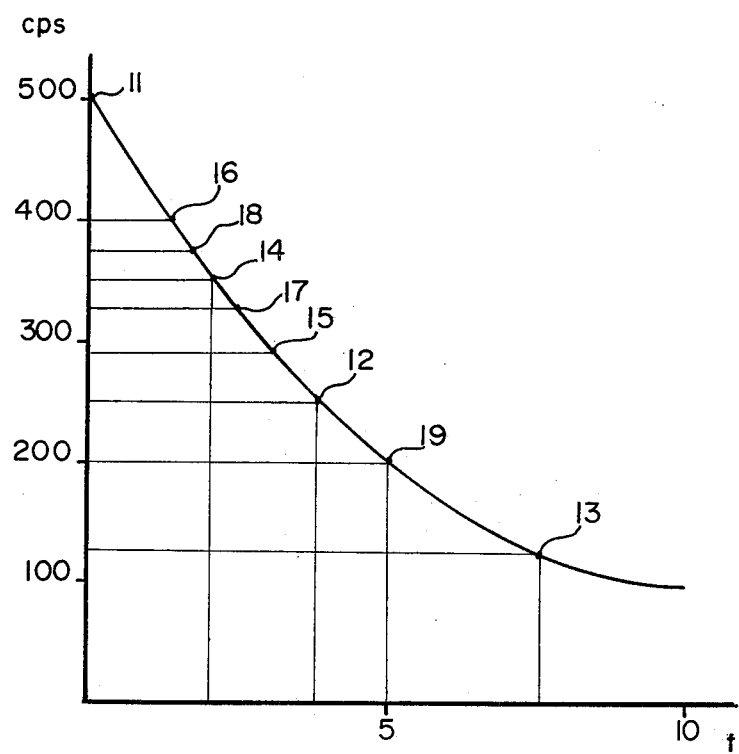
Figure 3:
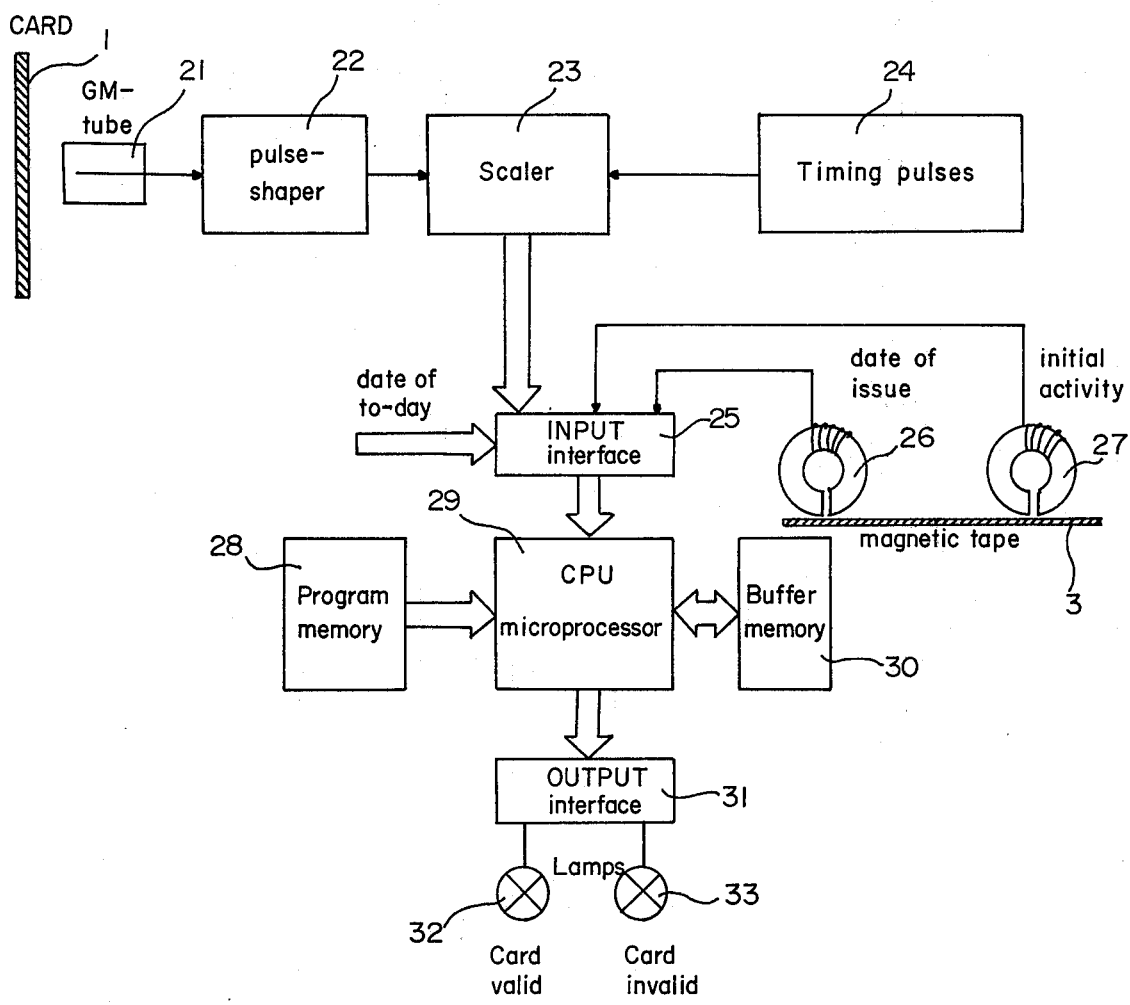

The invention will now be described with reference to the accompanying drawing. FIG. 1 illustrates an identity card of the invention. FIG. 2 illustrates the decay of a radioactive isotope. FIG. 3 illustrates the circuit of a checking apparatus.

The card of FIG. 1 is rectangular and has a field 1 at the top for an optical code, in this case in the form of holes 2 in a card which is otherwise not transparent. The card is also provided with a magnetic strip 3 extending straight across the card in its longitudinal direction. The magnetic strip 3 is preferably placed between two layers of the card, this preferably consisting of a laminate of two or more layers. The card also has a field 4 with a radioactive isotope. This can be applied on the card in known manner, for example by impregnating the field 4 with a solution of the radioactive substance, after which the solvent is allowed to evaporate. The card also has a photograph 5 of the owner, and a field 6 for information in print concerning the owner of the card. The name of the institute, for example a bank which issued the card is given in a field 7.

The date on which the validity of the card expires is given in a field 8. The card is suitably embedded in plastic in known manner.

When the illustrated card is issued to someone, the intensity of the radiation from the field 4 is measured and indicated in code form, together with the date of issue, on the magnetic strip 3. This information may be duplicated in the field 1 in optical form if it is of the type which need not be altered. Alternatively, the optically codified information may duplicate the information given in printing, or it may give some other form of relevant information. When the card is to be used, for example when money is to be withdrawn from a bank account, the bank clerk places the card in a reading apparatus which reads the magnetically codified information as to the radiation intensity and also the prevailing radiation intensity, compares the expected and the actual intensity, and gives an acceptance signal if the actual intensity is within a certain range around the expected intensity, but gives an alarm signal if the actual intensity is outside this range. If the magnetic code contains information concerning the most recent date when checking was performed, then the reading apparatus eradicates this information and instead inserts information relating to the current date of checking, and the current radiation intensity.

FIG. 2 illustrates the decay of the radioactive thallium isotope $Tl^{204}$ having a half-life of 3.8 years. The isotope has been applied on a card in a quantity to produce a radiation intensity of 500 cps (counts per second), point 11 on the curve. After 3.8 years the intensity has been reduced to 250 cps, point 12 on the curve. After 7.6 years the intensity has been reduced to 125 cps, point 13 on the curve. If the card is checked, for example when the owner makes a banking transaction, after two years, the expected radiation intensity is 350 cps, point 14 on the curve. The bank may prescribe that the card shall be accepted as genuine if the intensity falls within the wider range of 290-400 cps, points 15-16 on the curve, or within the narrower range of 325-375 cps, points 17-18 on the curve. If the card has a validity period of five years, the radiation intensity is 200 cps at the end of the validity period, point 19 on the curve.

The identity card may be controlled in a checking apparatus of the type illustrated in FIG. 3. The radiation from the card 1 is received by a detector in the form of a GM-tube 21. The signal from the GM-tube is transformed into pulses in a pulse-shaper 22, and the pulses are counted in a scaler 23. A timing unit 24 actuates the scaler so as to define the time during which pulses are counted, for example 1 second or 10 seconds. The output from the scaler 23 is transferred via an input interface 25 to a microprocessor 29, the operation of which is controlled by a program memory 28. The information received by the microprocessor 29 can be stored in a buffer memory 30.

Simultaneously, the information contained in the magnetic tape 3 of the card is read by two reading heads 26,27, the head 26 reading the date of issue, the head 27 reading the initial activity of the radioactive substance. The output from the reading heads 26, 27 is transferred via the input interface 25 (which also receives information on the current date) to the microprocessor 29. The microprocessor 29 now compares the current radiation intensity with the expected radiation intensity, using the formula for radioactive decay referred to above. If the current intensity agrees with the expected intensity (a certain degree of disagreement being allowed) the microprocessor 29 emits a signal via an output interface 31 to a lamp 32 indicating that the card is valid. If the current intensity falls outside the allowed expected intensity range the microprocessor 29 actuates a lamp 33 to indicate that the card is not valid.

What is claimed is:

1. A method of marking and verifying the validity of an identification card comprising the steps of:
    marking a card with a radioactive substance having a comparatively short half-life;
    applying to the card information of the initial intensity, $I_o$, of the radioactive substance, the date of measuring the initial intensity of the radioactive substance applied to the card and information defining the validity period of the card, said validity period being no greater than three times the half-life of the radioactive substance;
    measuring the radiation intensity of the radioactive substance on the card, and
    comparing the measured intensity with the intensity of the radiation as determined by the formula for radioactive decay
    $$I = I_o \cdot 2^{-t/t\frac{1}{2}}$$
    wherein I = the intensity measured on the occasion of measuring
    $I_o$ = the initial intensity
    t = the time between the date of determining $I_o$ and I
    t ½ = the half-life of the radioactive material,
    wherein information parameters for computing the formula are derived from the body of the card.

2. Method according to claim 1, wherein said method further comprises modifying said information to indicate the current intensity of the radiation and the current date of measuring the intensity of the radiation.

3. Method according to claim 1, comprising applying said information of the radiation intensity in codified form.

4. Method according to claim 1, wherein said comparatively short half-life is no greater than the order of magnitude of the half-life of $Tl^{204}$.

5. Method according to claim 1, wherein said identification card has a validity period of no greater than to order of five years.

6. An identification card containing validity verifying information, comprising a support member having incorporated therein a radioactive substance, said substance having a short half-life, and information on said card as to the initial intensity of the radioactive substance, the date of measuring the initial intensity of the radioactive substance and a validity period which is no greater than three times the half-life of the radioactive substance, said information being employed for validity checking and verification of the card by the radioactive decay formula
$$I = I_o \cdot 2^{-t/t\frac{1}{2}}$$
wherein I = the intensity measured on the occasion of measuring
$I_o$ = the initial intensity
t = the time between the date of determining $I_o$ and I
t½ = the half-life of the radioactive material
wherein information parameters for computing the formula are derived from the body of the card.

7. The identification card of claim 6, further comprising magnetic tape carried by said support membet, said magnetic tape containing said information as to the intensity of the radioactive substance and the date of measuring the initial intensity of the substance.

8. The identification card according to claim 6, wherein said information on said radiation intensity is in codified form.

9. The identification card of claim 6, wherein said radioactive material has a half-life no greater than the order of magnitude of the half-life of $Tl^{204}$.

10. The identification card of claim 6, wherein said identification card has a validity period of no greater than the order of five years.

* * * * *

UNITED STATES PATENT OFFICE
CERTIFICATE OF CORRECTION

Patent No. 3,959,630    Dated  May 25, 1976

Inventor(s)  Göran Högberg

It is certified that error appears in the above-identified patent and that said Letters Patent are hereby corrected as shown below:

In the heading of the Patent [30] should read as follows:

--[30]    Foreign Application Priority Data

June 5, 1972    Sweden............7368/72--.

Signed and Sealed this

Twenty-seventh Day of July 1976

[SEAL]

Attest:

RUTH C. MASON
*Attesting Officer*

C. MARSHALL DANN
*Commissioner of Patents and Trademarks*